(No Model.) 2 Sheets—Sheet 1.
R. BRANSTETTER.
LATHE FIXTURE FOR GEAR CUTTING.
No. 516,586. Patented Mar. 13, 1894.
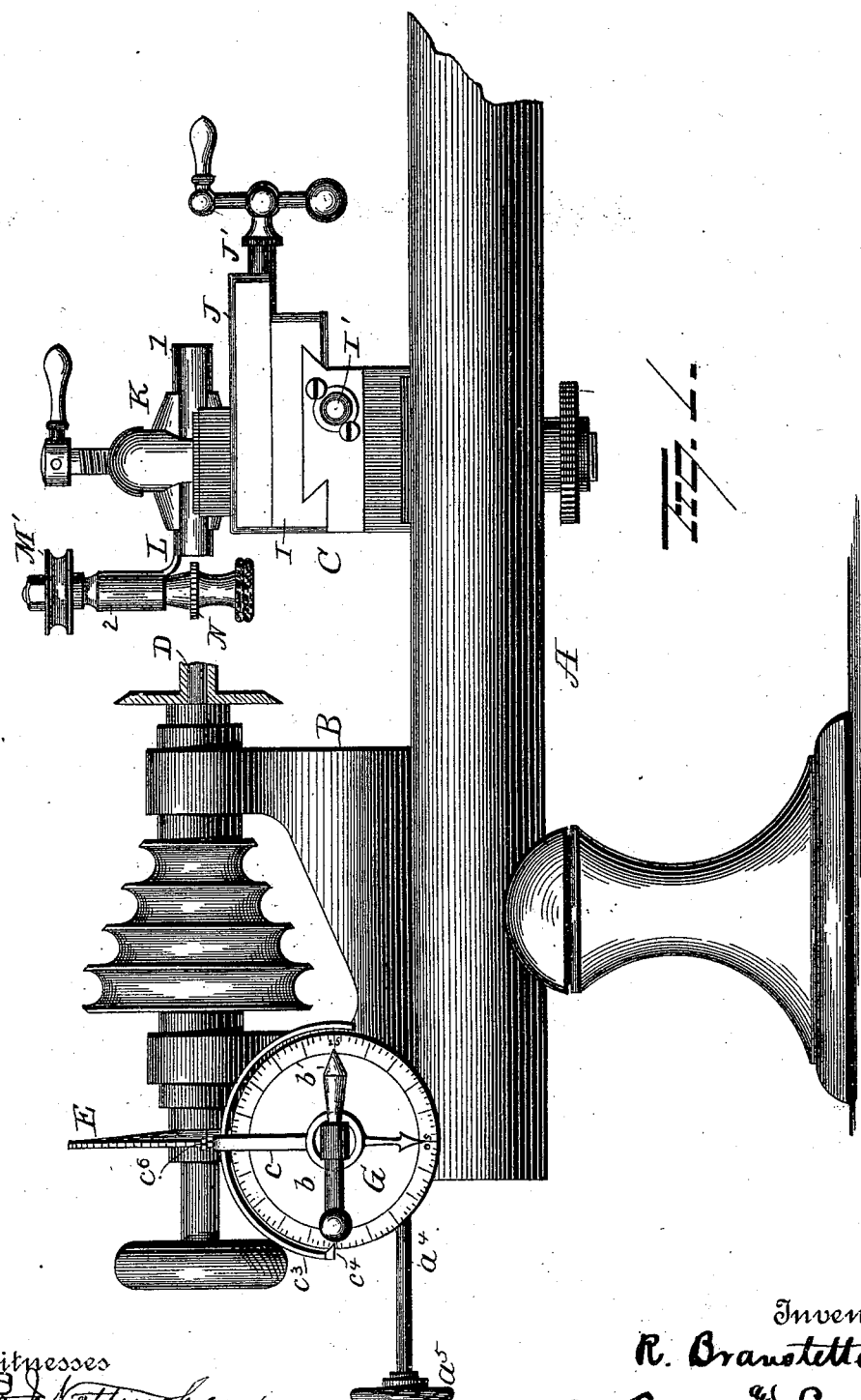
Witnesses
C. A. Nottingham
G. F. Downing
Inventor
R. Branstetter
By Leggett & Leggett
Attorneys

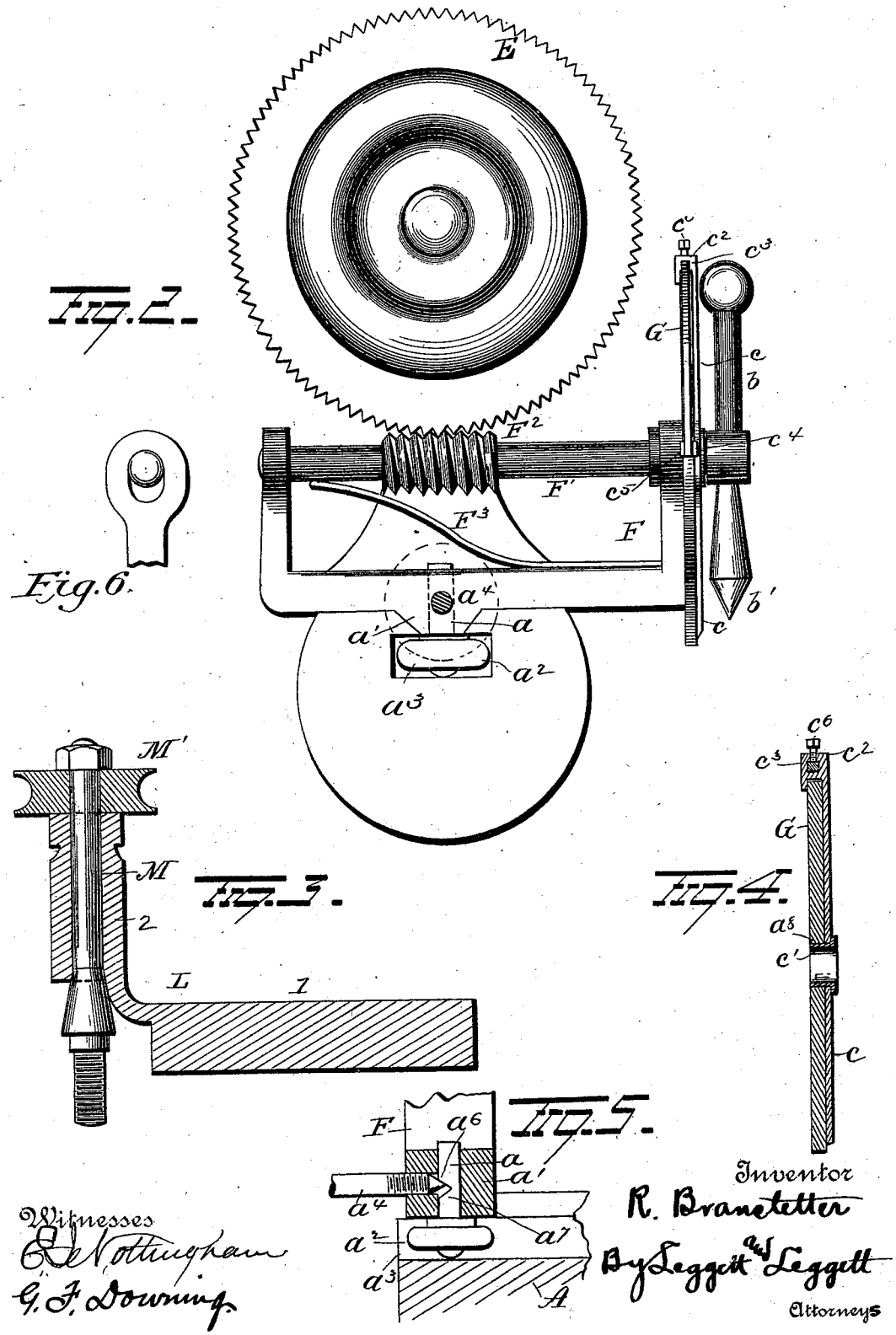

UNITED STATES PATENT OFFICE.

RAPER BRANSTETTER, OF WICHITA, KANSAS.

LATHE-FIXTURE FOR GEAR-CUTTING.

SPECIFICATION forming part of Letters Patent No. 516,586, dated March 13, 1894.

Application filed July 7, 1893. Serial No. 479,786. (No model.)

*To all whom it may concern:*

Be it known that I, RAPER BRANSTETTER, a resident of Wichita, in the county of Sedgwick and State of Kansas, have invented certain new and useful Improvements in Lathe-Fixtures for Gear-Cutting; and I do hereby declare the following to be a full, clear, and exact description of the invention, such as will enable others skilled in the art to which it appertains to make and use the same.

My invention relates to an improvement in lathe fixtures for gear cutting,—the object of the invention being to provide simple and efficient means adapted to be applied to a lathe for cutting gear teeth at any desired angle and to accurately space the teeth.

With this object in view the invention consists in certain novel features of construction and combinations and arrangements of parts as hereinafter set forth and pointed out in the claims.

In the accompanying drawings: Figure 1 is a side elevation illustrating my improvements. Fig. 2 is an end view. Figs. 3, 4, 5 and 6 are detail views.

A represents the bed of a lathe, on which a head stock B and a sliding and pivoted rest C are mounted. The blank from which the gear is to be made is placed on the end of the spindle D of the lathe and also placed on said spindle is a wheel E having, preferably, one hundred teeth. A frame F is removably connected to the bed B directly under the toothed wheel E by means of a pin $a$, which enters an enlargement $a'$ on the frame F, the head $a^2$ of said pin being adapted to enter the groove $a^3$ in the bed A. A screw-threaded rod $a^4$, is also adapted to enter the frame F and is provided with a wheel $a^5$, by means of which to turn it. The screw rod $a^4$ is made with a conical end $a^6$ adapted to enter a similarly shaped socket $a^7$ in the pin $a$, thus tending to force the bolt up and the frame down snug on the engine bed. The frame F carries a shaft F′, said shaft being mounted in bearings in the ends of the frame, one of which bearings is elongated as shown in Fig. 6. The shaft F′ carries a worm $F^2$ which meshes with the toothed wheel E, said worm being maintained snugly in mesh with the toothed wheel E by means of a spring $F^3$, adapted to bear at one end on the frame F and at the other end against the shaft F′, and thus compensate for any inequalities there may be in the toothed wheel. A dial G is carried by the frame F at one end thereof, and in the center of this dial an opening $a^8$ is made, through which the end of the shaft F′ projects without coming into contact with the dial, said shaft being provided at its end with a crank arm $b$, having a pointer $b'$. A pointer $c$ is mounted at a point between its ends on a hollow rivet $c'$, slightly larger than the opening $a^8$, said hollow rivet being adapted to enter the opening $a^8$, around the shaft projecting through said opening. One end of the pointer $c$ is adapted to project beyond the periphery of the dial G and is provided with a perforated enlargement $c^2$, through which a segment or gage $c^3$ concentric with the dial G, passes. One end of the segment or gage $c^3$ is provided with inwardly projecting lugs $c^4$, $c^5$, adapted to embrace the periphery of the dial, the lug $c^4$ serving as a pointer and the lug $c^5$ serving as a guide. A thumb screw $c^6$ is passed through the enlargement $c^2$ and is adapted to engage the segment $c^3$, whereby to lock the segment and pointer and cause them to move together. The purpose of these parts will be hereinafter explained. The face of the dial G has a number of degrees marked thereon equal to the number of teeth on the wheel E, preferably one hundred.

On the sliding rest C of the lathe, a laterally adjustable carriage I is mounted, and on said laterally adjustable carriage, a longitudinally adjustable carriage J is mounted, said carriages being provided with the usual screws I′, J′, for adjusting them.

On the carriage J a clamp K is mounted and adapted to receive and hold, in any desired position, a tool holder L. The tool holder L comprises a horizontal bar 1 adapted to be held by the clamp K, and a tubular sleeve 2. Through the sleeve 2 a spindle M is passed and has secured to it a cutter N. Said spindle M is also provided with a pulley M′, to which motion will be imparted in any suitable manner. From this construction and arrangement of parts it will be seen that the cutter can be readily adjusted for any size of wheel to be cut,—it can be adjusted to and from the wheel being operated upon and can be adjusted at any angle desired so as to adapt it to cut any desired bevel teeth. It will also be seen that in order to rotate the spindle once it will be necessary to revolve the shaft F', one hundred times, so that in order to revolve the wheel being operated upon once, the crank $b$ must be turned one hundred times. Suppose now that it is desired to cut, say twenty-three teeth in the periphery of the blank on the spindle D. The pointer $b'$ will be made to register with 100 on the dial G, after which the first tooth will be cut in the blank. Then to get the required distance between pointer $c$ and lug $c^4$ to indicate the distance, the pointer $b'$ must turn in addition to the required number of complete revolutions, the index finger or pointer $c$ is first placed at 100 and the lug $c^4$ on the gage is moved on beyond the 100 point the distance of thirty-four and eighteen twenty-thirds degrees. The crank $b$ will then be revolved four times and stopped over lug $c^4$ the distance traveled being four hundred and thirty-four and eighteen twenty-thirds degrees which is equivalent to one twenty-third of the number of degrees which must be passed in the formation of the twenty-three teeth. When the crank arm and pointer are thus brought to a stand still, the next tooth will be cut. Then the pointer $c$ is moved to the point where the pointer $b'$ stopped. The operation of revolving the crank $b$ is then repeated, the pointer $b'$ always being stopped at the lug $c^4$ after having passed pointer $c$ the fourth time. By the provision of the segment or gage $c^3$ adapted to move with the pointer $c$, mistakes in counting will be effectually prevented when cutting a wheel where it requires fractions of a degree. The pointer is set at 100 and the gage or segment is made to point to the stopping number so that it is only necessary to move the pointer of the crank arm after cutting each tooth.

With my improvements I can, very accurately, space each tooth and can make any combination less than ten thousand.

My improvements are very simple in construction, easy to operate, accurate, and effectual in every respect, in the performance of their functions.

Having fully described my invention, what I claim as new, and desire to secure by Letters Patent, is—

1. In a lathe fixture for cutting gear teeth, the combination with a shaft adapted to carry the blank to be operated upon, and a toothed wheel secured on said shaft, of a frame, a shaft revolubly supported in the frame, said shaft having a worm thereon, a spring secured to the frame and bearing upward upon the worm shaft, a handle or crank on the worm shaft by means of which it is turned; said handle or crank having a pointer thereon; a dial, a pointer adapted to turn on the dial, and a gage adjustably connected with the pointer thereon, substantially as set forth.

2. The combination with a shaft adapted to carry the blank to be operated upon thereon, a toothed wheel, a worm shaft operating in connection with the toothed wheel, and means for turning the latter, of a dial, a pointer having pivotal connection with the dial whereby it may be set relative thereto, said pointer having a set screw therein, and a gage having a pointer on one end which straddles the edge of the disk, said gage being held adjustably connected with the pointer by means of the set screw, substantially as set forth.

In testimony whereof I have signed this specification in the presence of two subscribing witnesses.

RAPER BRANSTETTER.

Witnesses:
EDWARD VAIL,
CHARLES H. KEACH.